United States Patent
Fletcher et al.

(10) Patent No.: US 10,443,627 B2
(45) Date of Patent: Oct. 15, 2019

(54) VACUUM PRODUCING DEVICE HAVING A SUCTION PASSAGEWAY AND A DISCHARGE PASSAGEWAY ENTERING THROUGH THE SAME WALL

(71) Applicants: David E. Fletcher, Flint, MI (US); Brian M. Graichen, Leonard, MI (US); James H. Miller, Ortonville, MI (US); Keith Hampton, Ann Arbor, MI (US)

(72) Inventors: David E. Fletcher, Flint, MI (US); Brian M. Graichen, Leonard, MI (US); James H. Miller, Ortonville, MI (US); Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 60 days.

(21) Appl. No.: 15/065,470

(22) Filed: Mar. 9, 2016

(65) Prior Publication Data
US 2016/0265557 A1  Sep. 15, 2016

Related U.S. Application Data

(60) Provisional application No. 62/130,422, filed on Mar. 9, 2015, provisional application No. 62/193,633, filed on Jul. 17, 2015.

(51) Int. Cl.
*F04F 5/20* (2006.01)
*F04F 5/46* (2006.01)
(Continued)

(52) U.S. Cl.
CPC .............. *F04F 5/20* (2013.01); *F04F 5/464* (2013.01); *F04F 5/466* (2013.01); *B60T 13/46* (2013.01);
(Continued)

(58) Field of Classification Search
CPC ........ F04F 5/20; F04F 5/00; F04F 5/14; F04F 5/466; F04F 5/464; F04F 5/22; F04F 5/46; B60T 13/46; F02M 35/10229
See application file for complete search history.

(56) References Cited

U.S. PATENT DOCUMENTS 1,845,969 A   2/1932  Hueber
2,044,088 A *  6/1936  Lord ..................... E02F 3/90
                                                209/44
(Continued)

FOREIGN PATENT DOCUMENTS

CN   203394893 U   1/2014
CN   203485907 U   3/2014
(Continued)

OTHER PUBLICATIONS

EP, Supplementary European Search Report; Patent Application No. 14811266.7; 5 pages (dated Apr. 5, 2017).
(Continued)

*Primary Examiner* — Bryan M Lettman
*Assistant Examiner* — Timothy P Solak
(74) *Attorney, Agent, or Firm* — FisherBroyles, LLP; Susan M. Oiler

(57) ABSTRACT

Venturi devices that create vacuum have a housing defining a motive passageway converging toward a suction chamber, a discharge passageway diverging away from the suction chamber, and a suction passageway in fluid communication with the suction chamber. Within the suction chamber, a motive exit of the motive passageway is generally aligned with and spaced apart from a discharge entrance of the discharge passageway to define a Venturi gap, and the suction passageway enters the suction chamber at a position that generates about a 180 degree change in the direction of suction flow from the suction passageway to the discharge passageway. The motive passageway may terminate in a
(Continued)

spout protruding into the suction chamber disposed spaced apart from all one or more sidewalls of the suction chamber and may subdivide downstream of the single entrance into two or more subpassageways each leading to one of two or more motive exits.

**12 Claims, 9 Drawing Sheets
(2 of 9 Drawing Sheet(s) Filed in Color)**

(51) Int. Cl.
  *B60T 13/46* (2006.01)
  *F02M 35/10* (2006.01)
  *B60T 17/02* (2006.01)

(52) U.S. Cl.
  CPC ........ *B60T 17/02* (2013.01); *F02M 35/10222* (2013.01); *F02M 35/10229* (2013.01)

(56) References Cited

U.S. PATENT DOCUMENTS

| | | | | |
|---|---|---|---|---|
| 2,074,480 | A | * | 3/1937 | MacLean ................ F04F 5/466 417/179 |
| 2,382,391 | A | * | 8/1945 | Berman .................... F04F 5/46 417/198 |
| 2,790,595 | A | * | 4/1957 | Ebner ..................... F04F 5/466 417/163 |
| 3,064,878 | A | * | 11/1962 | Bayles .................... F04F 5/461 417/151 |
| 3,234,932 | A | | 2/1966 | Bird et al. |
| 3,239,131 | A | | 3/1966 | Whyte |
| 3,592,438 | A | | 7/1971 | Greenwood et al. |
| 3,754,841 | A | | 8/1973 | Grabb et al. |
| 3,921,915 | A | * | 11/1975 | Glenn ...................... B05B 1/10 239/589 |
| 4,070,292 | A | | 1/1978 | Adams |
| 4,211,200 | A | | 7/1980 | Rocchio et al. |
| 4,499,034 | A | | 2/1985 | McAllister |
| 4,519,423 | A | * | 5/1985 | Ho ......................... B01F 5/045 137/888 |
| 4,554,786 | A | | 11/1985 | Takeuchi et al. |
| 4,834,132 | A | | 5/1989 | Sasaki et al. |
| 5,108,266 | A | | 4/1992 | Hewitt |
| 5,167,046 | A | * | 12/1992 | Benson .................... A47L 5/18 15/409 |
| 5,188,141 | A | | 2/1993 | Cook et al. |
| 5,291,916 | A | | 3/1994 | Kloosterman et al. |
| 5,431,346 | A | * | 7/1995 | Sinaisky .................. B05B 1/00 239/399 |
| 5,816,446 | A | | 10/1998 | Steindorf et al. |
| 6,010,329 | A | * | 1/2000 | Zagoroff ............... B01F 5/0413 126/405 |
| 6,035,881 | A | | 3/2000 | Emmerich et al. |
| 6,163,239 | A | | 12/2000 | Ozawa et al. |
| 6,192,911 | B1 | * | 2/2001 | Barnes ................. B01F 5/0428 137/12 |
| RE37,090 | E | | 3/2001 | Kloosterman et al. |
| 6,220,271 | B1 | | 4/2001 | Emmerich et al. |
| 6,638,059 | B1 | * | 10/2003 | Mougey ................. F04F 5/466 431/202 |
| 7,722,132 | B2 | | 5/2010 | Carlsson |
| 8,622,715 | B1 | | 1/2014 | Lott et al. |
| 9,827,963 | B2 | | 11/2017 | Fletcher et al. |
| 2006/0016477 | A1 | | 1/2006 | Zaparackas |
| 2008/0007113 | A1 | | 1/2008 | Choi |
| 2008/0121480 | A1 | | 5/2008 | Kawamori et al. |
| 2011/0132311 | A1 | | 6/2011 | Pursifull et al. |
| 2011/0186151 | A1 | | 8/2011 | Sparazynski |
| 2012/0199104 | A1 | | 8/2012 | Vogl |
| 2012/0315559 | A1 | | 12/2012 | Noh et al. |
| 2013/0160877 | A1 | * | 6/2013 | Walter ............. B60K 15/03504 137/565.22 |
| 2013/0213510 | A1 | | 8/2013 | Burnham et al. |
| 2013/0233276 | A1 | | 9/2013 | Pursifull et al. |
| 2013/0233287 | A1 | | 9/2013 | Leone |
| 2013/0340732 | A1 | | 12/2013 | Pursifull et al. |
| 2014/0197345 | A1 | | 7/2014 | Graichen et al. |
| 2014/0360607 | A1 | | 12/2014 | Fletcher et al. |

FOREIGN PATENT DOCUMENTS

| | | |
|---|---|---|
| DE | 4310761 | 10/1994 |
| GB | 1402996 | 8/1975 |
| GB | 2129516 | 5/1984 |
| JP | 2001-295800 | 10/2001 |
| JP | 2011-191868 A | 9/2011 |
| WO | 2014/094890 | 6/2014 |

OTHER PUBLICATIONS

PCT, International Search Report and Written Opinion; PCT/US2014/041250 (dated Oct. 27, 2014).
U.S. Non-Final Office Action; U.S. Appl. No. 14/294,727 (dated Oct. 8, 2015).
U.S. Final Office Action; U.S. Appl. No. 14/294,727 (dated Apr. 22, 2016).
U.S. Advisory Action; U.S. Appl. No. 14/294,727 (dated Aug. 22, 2016).
PCT, International Search Report and Written Opinion; PCT/US2016/021559 (dated May 12, 2016).
CN, Office Action and Search Report with English translation; Chinese Patent Application No. 201410413220.7; (dated Nov. 14, 2016).
CN Search Report with English Translation, Chinese Patent Application No. 201580042186X, dated Oct. 31, 2017 (3 pages).
CN, Second Office Action with English Translation, Chinese Application No. 201410413220.7 dated Jul. 18, 2017 (5 pages).
CN, Third Office Action, Supplemental Search Report with English Translation, Chinese Application No. 201410413220.7 dated Jan. 3, 2018 (6 pages).
CN, Third Office Action English Translation; Chinese Application No. 201410413220.7 (dated Jan. 17, 2018).
JP, Non-Final Office Action with English Translation; Japanese Application No. 2016-519556 (dated May 18, 2018).
U.S. First Office Action; U.S. Appl. No. 15/791,561 (dated Jul. 26, 2018).
CN, First Office Action; Chinese Application No. 201680013143.3 (dated Jul. 31, 2018).
CN, First Office Action Search Report; Chinese Application No. 201680013143.3 (dated Jul. 31, 2018).
U.S. Final Office Action; U.S. Appl. No. 15/097,558 (dated Apr. 4, 2018).
EP, Supplemental Search Report; European Application No. 16762428.7 (dated Jul. 5, 2018).
U.S. Non-Final Office Action; U.S. Appl. No. 15/097,558 (dated Sep. 10, 2018).
EP, Supplemental Search Report; European Application No. 16780599.3 (dated Dec. 18, 2018).

* cited by examiner

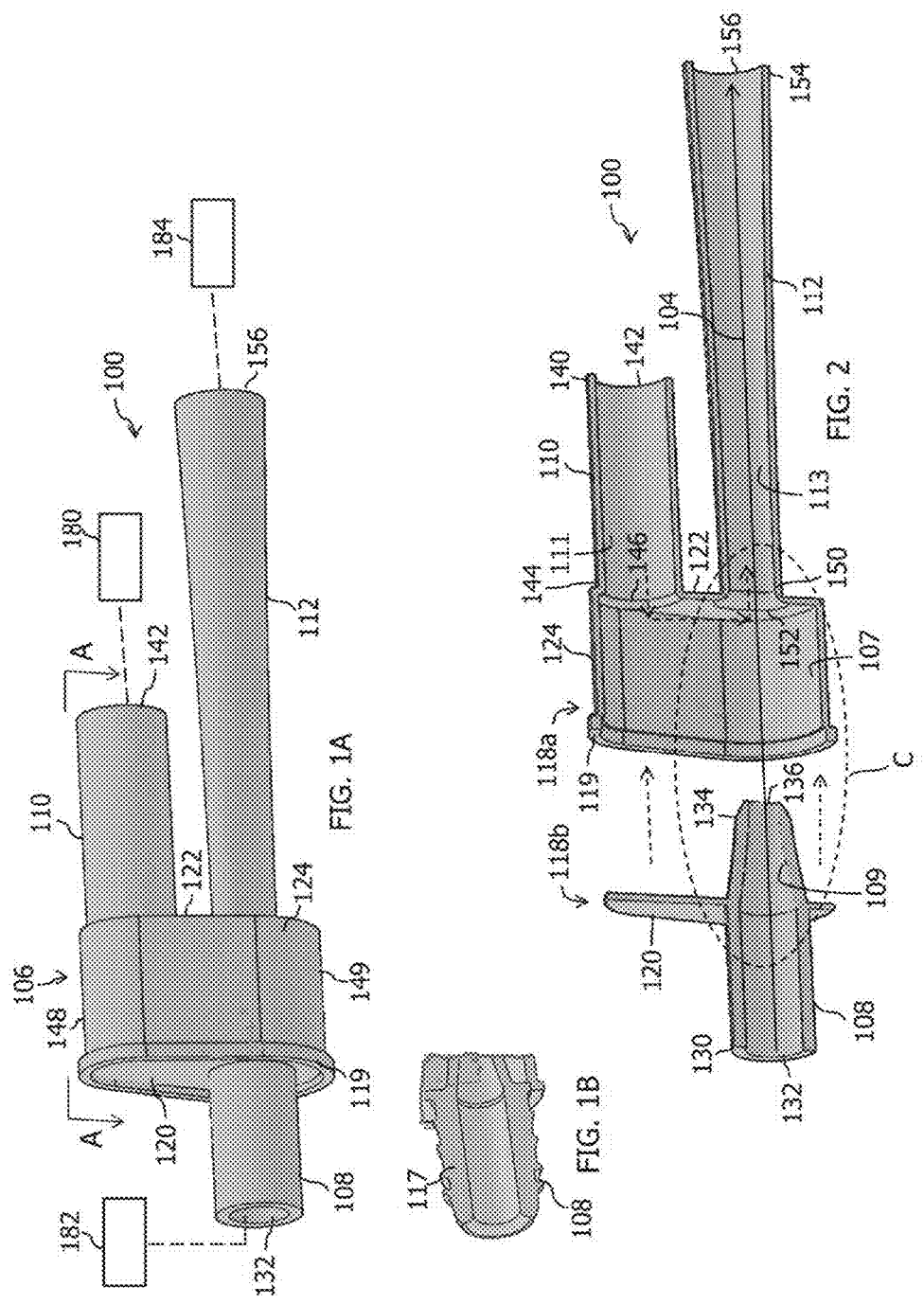

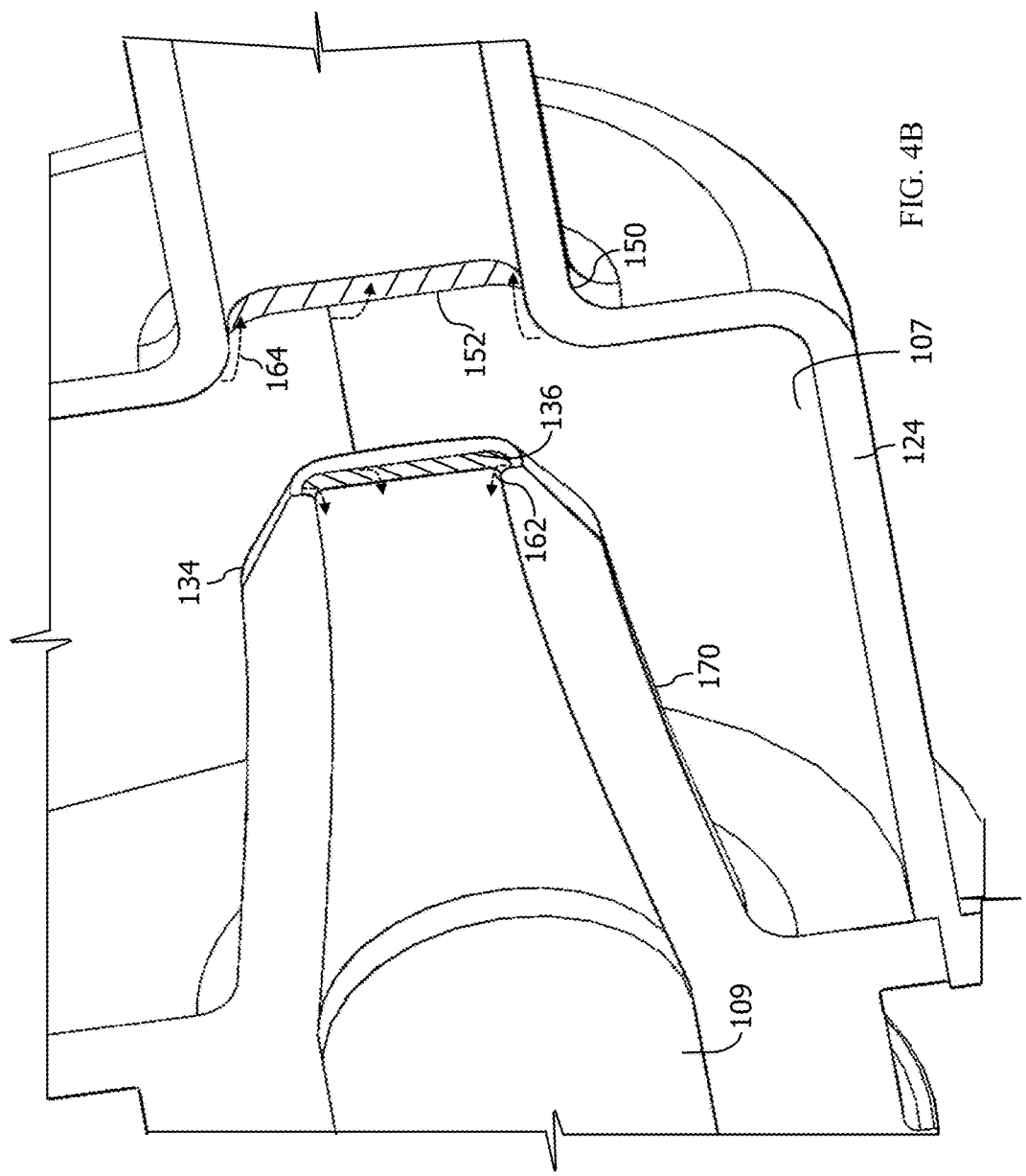

VACUUM PRODUCING DEVICE HAVING A SUCTION PASSAGEWAY AND A DISCHARGE PASSAGEWAY ENTERING THROUGH THE SAME WALL

RELATED APPLICATIONS

This application claims the benefit of U.S. Provisional Application No. 62/130,422, filed Mar. 9, 2015, and U.S. Provisional Application No. 62/193,633, filed Jul. 17, 2015, which are both incorporated herein by reference.

TECHNICAL FIELD

This application relates to devices for producing vacuum using the Venturi effect, more particularly to such devices having increased suction flow generated with a moderate motive flow rate.

BACKGROUND

Engines, for example vehicle engines, are being downsized and boosted, which is reducing the available vacuum from the engine. This vacuum has many potential uses, including use by the vehicle brake booster.

One solution to this vacuum shortfall is to install a vacuum pump. Vacuum pumps, however, have a significant cost and weight penalty to the engine, their electric power consumption can require additional alternator capacity, and their inefficiency can hinder fuel economy improvement actions.

Another solution is an evacuator that generates vacuum by creating an engine air flow path that is parallel to the throttle, referred to as an intake leak. This leak flow passes through a Venturi that generates a suction vacuum. The problem with the presently available evacuators is that they are limited in the amount of vacuum mass flow rate they can generate, and by the amount of engine air they consume.

A need exists for improved designs that generate increased suction mass flow rate, in particular when the motive flow is a boosted motive flow.

SUMMARY

In one aspect, devices for producing vacuum using the Venturi effect are disclosed that have a housing defining a suction chamber, a motive passageway converging toward the suction chamber and in fluid communication therewith, a discharge passageway diverging away from the suction chamber and in fluid communication therewith, and a suction passageway in fluid communication with the suction chamber. Within the suction chamber, a motive exit of the motive passageway is generally aligned with and spaced apart from a discharge entrance of the discharge passageway to define a Venturi gap, and the suction passageway enters the suction chamber at a position that generates about a 180 degree change in the direction of suction flow from the suction passageway to the discharge passageway.

In all aspects of the devices, the devices may include one or all of the following features. The motive passageway and the discharge passageway both diverge in cross-sectional area away from the suction chamber as a hyperbolic or parabolic function. The suction chamber has about a 10 mm to about a 25 mm internal width. The motive exit has a first corner radius inside the motive passageway, and the discharge entrance may be generally flush with a wall of the suction chamber and transitions thereto with a second corner radius. Here, the second corner radius is larger than the first corner radius, and the cross-sectional area of the motive exit may be smaller than the cross-sectional area of the discharge entrance.

The motive passageway may terminate in a spout protruding into the suction chamber and disposed spaced apart from all one or more sidewalls of the suction chamber thereby providing suction flow around the entirety of an exterior surface of the spout, and when it does, the exterior surface of the spout converges toward the outlet end of the motive passageway with one or more converging angles when viewed in a longitudinal cross-section. Here, the suction chamber has a generally rounded interior bottom below the spout.

In another aspect, devices for producing vacuum using the Venturi effect are disclosed that have a housing defining a suction chamber, a motive passageway converging toward the suction chamber and in fluid communication therewith, a discharge passageway diverging away from the suction chamber and in fluid communication therewith, and a suction passageway in fluid communication with the suction chamber. Within the suction chamber, a motive exit of the motive passageway is generally aligned with and spaced apart from a discharge entrance of the discharge passageway to define a Venturi gap, and the motive passageway terminates in a spout protruding into the suction chamber disposed spaced apart from all one or more sidewalls of the suction chamber thereby providing suction flow around the entirety of an exterior surface of the spout. In all aspects of the devices, the devices may include one or all of the following features.

The suction passageway is disposed parallel to the discharge passageway. The exterior surface of the spout converges toward the outlet end of the motive passageway, and the suction chamber has a generally rounded interior bottom below the spout. The suction chamber has about a 10 mm to about a 25 mm internal width.

The motive exit has a first corner radius inside the motive passageway, and the discharge entrance may be generally flush with a wall of the suction chamber and transitions thereto with a second corner radius. Here, the second corner radius is larger than the first corner radius, and the cross-sectional area of the motive exit may be smaller than the cross-sectional area of the discharge entrance.

At least the discharge passageway is an internal passageway formed by hyperboloid curves connecting the discharge entrance to a discharge exit, but the motive passageway and the discharge passageway may both diverge in cross-sectional area away from the suction chamber as a hyperbolic or parabolic function.

In another aspect, systems are disclosed that include any one of the above devices for producing vacuum using the Venturi effect, a source of boost pressure fluidly connected to the motive passageway, a device requiring vacuum fluidly connected to the suction passageway, and atmospheric pressure fluidly connected to the discharge passageway, with atmospheric pressure being less than the boost pressure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A is a side, perspective view of a device that generates vacuum using the Venturi effect.

FIG. 1B is a side, longitudinal, cross-sectional view of just the inlet end of the motive port of an alternate embodiment of the device of FIG. 1.

FIG. 2 is a side, longitudinal, exploded cross-sectional view of the device of FIG. 1.

FIG. 4B is a further enlargement of the outlet end 134 and the inlet end 150 to emphasize the corner radii 162, 164.

DETAILED DESCRIPTION

Figure 3:
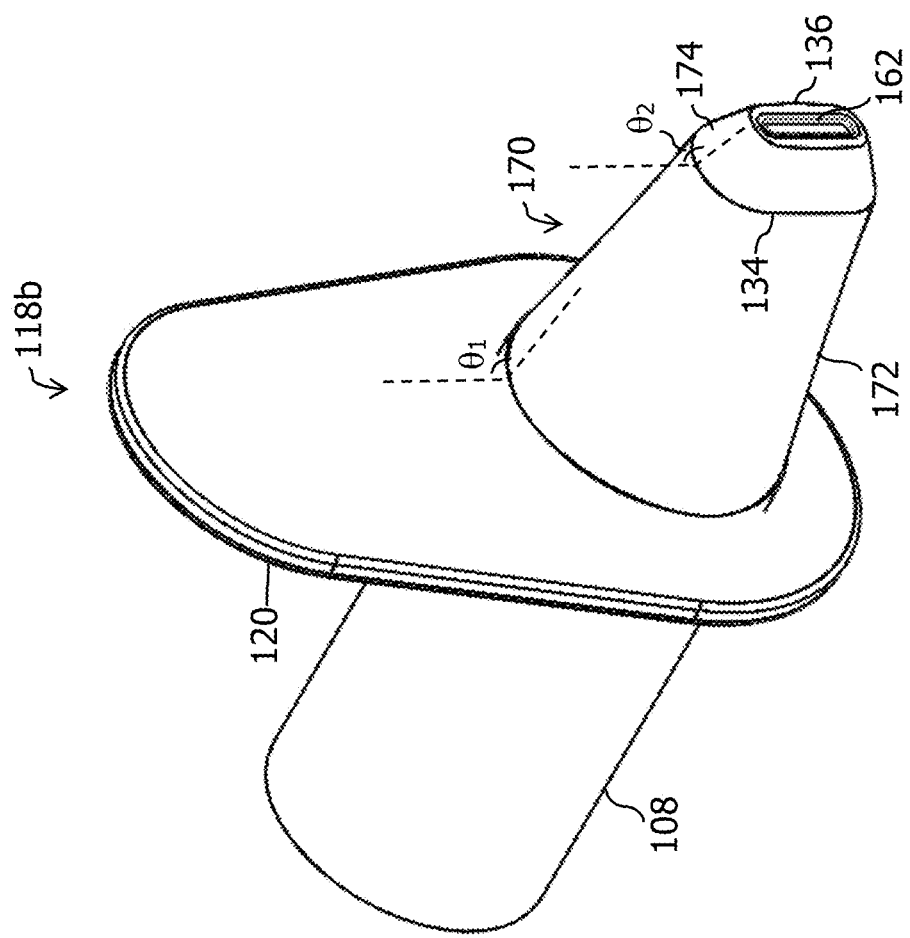
FIG. 3 is a side perspective view, generally from the motive exit end, of the motive port portion of the device of FIG. 1.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIGS. 1-4 illustrate different views of a device 100 for producing vacuum using a Venturi effect. The device 100 may be used in an engine, for example, in a vehicle's engine (an internal combustion engine) to provide vacuum to a device requiring vacuum, such as a vehicle brake boost device, positive crankcase ventilation system, a fuel vapor canister purge device, a hydraulic and/or pneumatic valve, etc. Device 100 includes a housing 106 defining a suction chamber 107 in fluid communication with passageway 104 (FIG. 2), which extends from the motive entrance 132 of the motive port 108 to the discharge exit 156 of the discharge port 112. The device 100 has at least three ports that are connectable to an engine or components connected to the engine. The ports include: (1) a motive port 108; (2) a suction port 110, which can connect via an optional check valve (not shown) to a device requiring vacuum 180; and (3) a discharge port 112. Each of these ports 108, 110, and 112 may include a connector feature 117 on an outer surface thereof for connecting the respective port to a hose or other component in the engine as shown in FIG. 1A for the motive port 108.

Referring now to FIGS. 1A and 2, the housing 106 defining the suction chamber 107 includes a first end wall 120 proximate the motive port 108, a second end wall 122 proximate the discharge port 112 and at least one side wall 124 extending between the first and second end walls 120, 122. The suction chamber when viewed in a transverse cross-section may be generally pear-shaped, i.e., having a rounded top 148 and rounded bottom 149 where the rounded top is narrower than the rounded bottom. As shown in FIG. 2, the suction chamber 107 may be a two-part construction having a container 118a and a lid 118b, where the lid 118b seats within or against a rim 119 of the container 118a with a fluid-tight seal. Here, the container 118a includes the suction port 110 and the discharge port 112 and the lid 118b includes the motive port 108, but is not limited thereto. In another embodiment, the container could include the motive port and the lid could include the suction port and the discharge port.

Still referring to FIG. 2, the motive port 108 defines a motive passageway 109 converging toward the suction chamber 107 and in fluid communication therewith, the discharge port 112 defines a discharge passageway 113 diverging away from the suction chamber 107 and in fluid communication therewith, and the suction port 110 defines a suction passageway 111 in fluid communication with the suction chamber 107. These converging and diverging sections gradually, continuously taper along the length of at least a portion of the interior passageway 109, 111, or 113. The motive port 108 includes an inlet end 130 having a motive entrance 132 and an outlet end 134 having a motive exit 136. Similarly, the suction port 110 includes an inlet end 140 having a suction entrance 142 and an outlet end 144 having a suction exit 146, wherein both the motive exit 136 and the suction exit 146 exit into the suction chamber 107. The discharge port 112 includes an inlet end 150, proximate the suction chamber 107, having a discharge entrance 152, and an outlet end 154, distal from the suction chamber 107, having a discharge exit 156. As illustrated in FIG. 2, the suction passageway 111 enters the suction chamber 107 at a position that generates about a 180 degree change in the direction of the suction flow from the suction passageway 111 to the discharge passageway 113. Accordingly, the suction port 110 is generally parallel to the discharge port 112.

Figure 4A:
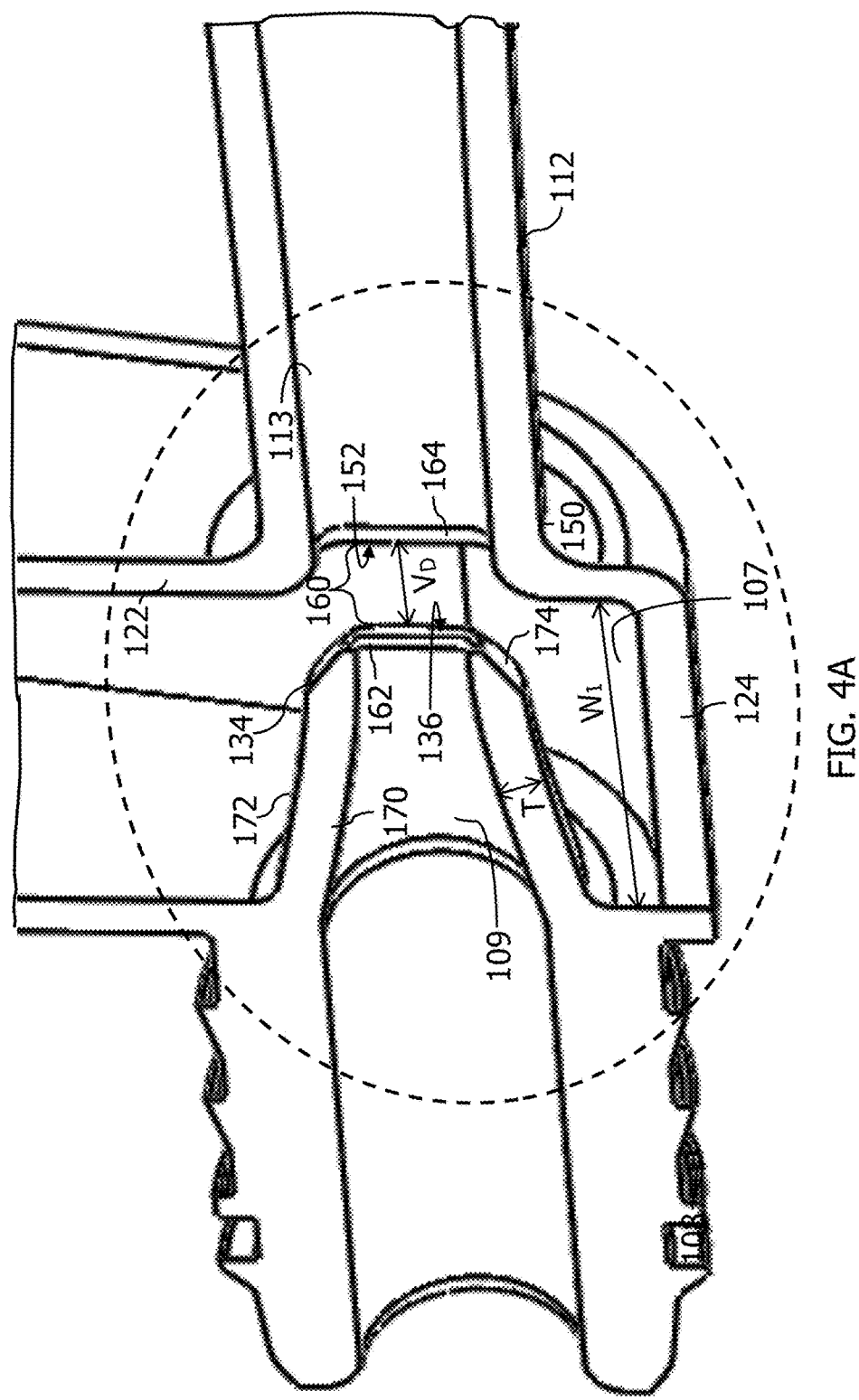
FIG. 4A is an enlarged, side, cross-sectional perspective view of the portion of the device of FIG. 1 inside the dashed oval.

In the assembled device 100, in particular, within the suction chamber 107, as shown in FIG. 4, the outlet end 134 of the motive passageway 109, more specifically, the motive exit 136, is generally aligned with and spaced apart from the discharge entrance 152 at the inlet end 150 of the discharge passageway 113 to define a Venturi gap 160. The Venturi gap 160, as used herein, means the lineal distance $V_D$ between the motive exit 136 and the discharge entrance 152. The motive exit 136 has a first corner radius 162 inside the motive passageway 109, and the discharge entrance 152 is generally flush with the second end wall 122 of the suction chamber 107 and transitions thereto with a second corner radius 164 that is larger than the first corner radius 162. These corner radii 162, 164 are advantageous because not only does the curvature influence the direction of flow, it also helps to locate the manufacturing defects, known as burrs, away from the high flow velocity regions.

Referring to FIGS. 2-4, the motive passageway 109 terminates in a spout 170 protruding into the suction chamber 107, which has an internal width $W_I$ as labeled in FIG. 4 of about 10 mm to about 25 mm, or more preferably about 15 mm to about 20 mm. The spout 170 is disposed spaced apart from all one or more sidewalls 124 of the suction chamber 107, thereby providing suction flow around the entirety of an exterior surface 172 of the spout 170. The exterior surface 172 is generally frustoconical and converges toward the outlet end 134 of the motive passageway 109 with a first converging angle $\theta_1$ (labeled in FIG. 3). The exterior surface 172 may transition into a chamfer 174 more proximate the outlet end 134 than the first end wall 120. The chamfer 174 has a second converging angle $\theta_2$ that is greater than the first converging angle $\theta_1$. The chamfer 174 as shown in FIG. 3 changes the generally circular frustoconical exterior surface 172 to a generally more rounded-rectangular or elliptical frustoconical shape. The bottom of the suction chamber 107 below the spout 170 may have a generally rounded interior bottom. The shape of the exterior surface 172, and/or the chamfer 174, and the interior bottom of the suction chamber 107 is advantageous to direct suction flow toward the discharge entrance 152 and do so with minimal disturbance/interference in the flow.

The spout 170 has a wall thickness T that may be about 0.5 mm to about 5 mm, or about 0.5 to about 3 mm, or about 1.0 mm to about 2.0 mm depending upon the material selected for the construction of the device 100.

As best seen in FIG. 4, the cross-sectional area of the motive exit 136 is smaller than the cross-sectional area of the discharge entrance 152; this difference is referred to as the offset. The offset of the cross-sectional areas may vary depending upon the parameters of the system into which the device 100 is to be incorporated. In one embodiment, the offset may be in the range of about 0.1 mm to about 2.5 mm, or more preferably in a range of about 0.3 mm to about 1.5 mm. In another embodiment, the offset may be in the range of about 0.5 mm to about 1.2 mm, or more preferably in a range of about 0.7 mm to about 1.0 mm.

When device 100 is for use in a vehicle engine, the vehicle manufacturer typically selects the size of both the motive port 108 and discharge port 112 based on the tubing/hose size available for connection of the device 100 to the engine or components thereof. Additionally, the vehicle manufacturer typically selects the maximum motive flow rate available for use in the system, which in turn will dictate the area of the interior opening defined at the motive outlet end 134, i.e., the motive exit 136. Working within these constraints, the disclosed devices 100 significantly reduce the compromise between the desire to produce high suction flow rates at moderate motive flow rates provided under boost conditions of an engine. This reduction in the compromise is accomplished by changing the configuration of the orientation of the suction port 110, the suction chamber 107, including its internal width and shape, the spout of the motive port 108, the offset of the motive exit and the discharge entrance, adding the corner radii to the motive exit and/or the discharge entrance, and varying the Venturi gap $V_D$.

In operation, the device 100, in particular the suction port 110, is connected to a device requiring vacuum (see FIG. 1), and the device 100 creates vacuum for said device by the flow of fluid, typically air, through passageway 104, extending generally the length of the device, and the Venturi gap 160 (labeled in FIG. 4) defined thereby within the suction chamber 107. In one embodiment, the motive port 108 is connected for fluid communication of its motive passageway with a source of boost pressure and the discharge passageway is connected for fluid communication of its discharge passageway with atmospheric pressure, which is less than the boost pressure. In such an embodiment, the device 100 may be referred to as an "ejector." In another embodiment, the motive port 108 may be connected to atmospheric pressure and the discharge port may be connected to a source of pressure that is less than atmospheric pressure. In such an embodiment, the device 100 may be referred to as an "aspirator." The flow of fluid (e.g., air) from the motive port to the discharge port draws the fluid down the motive passageway, which can be a straight cone, a parabolic profile, or a hyperbolic profile, as described herein. The reduction in area causes the velocity of the air to increase. Because this is an enclosed space the laws of fluid mechanics state that the static pressure must decrease when the fluid velocity increases. The minimum cross sectional area of the converging motive passageway abuts the Venturi gap. As air continues to travel to the discharge port, it travels through the discharge entrance and diverging discharge passageway, which is either a straight cone, a parabolic profile, or a hyperbolic profile. Optionally, the discharge passageway can continue as a straight, parabolic profile, or hyperbolic profile cone until it joins the discharge exit, or it can transition to a simple cylindrical or tapered passage before reaching the discharge exit.

In a desire to increase the flow rate of air from the suction port 110 into the Venturi gap 160, the area of the Venturi gap is increased by increasing the perimeter of the discharge entrance 152 without increasing the overall inner dimension of the first motive passageway 109. In particular, the motive exit 136 and the discharge entrance 152 are non-circular as explained in co-owned U.S. patent application Ser. No. 14/294,727, filed on Jun. 3, 2014 because a non-circular shape having the same area as a passageway with a circular cross-section is an increase in the ratio of perimeter to area. There are an infinite number of possible shapes that are not circular, each with a perimeter and a cross-sectional area. These include polygons, or straight line segments connected to each other, non-circular curves, and even fractal curves. To minimize cost, a curve is simpler and easy to manufacture and inspect, and has a desirable perimeter length. In particular, elliptical- or polygonal-shaped embodiments for the internal cross-sections of the motive and discharge passageways are discussed in the co-owned application referred to above. This increase in perimeter, which is further enhanced by the first corner radius of the motive exit and the second corner radius of the discharge entrance disclosed herein, will again provide the advantage of increasing the intersection area between the Venturi gap and the suction port, resulting in an increase in suction flow.

So, as shown in FIG. 2, the motive passageway 109 and the discharge passageway 113 both converge in cross-sectional area toward the suction chamber 107 as a hyperbolic or parabolic function. The motive entrance 132 and the discharge exit 156 may be the same shape or different and may be generally rectangular, elliptical or circular. In FIGS. 1 and 2, motive entrance 132 and the discharge exit 156 are depicted as circular, but the motive exit 136 and the discharge entrance 152, i.e., the interior shape of each opening, are rectangularly- or elliptically-shaped. Other polygonal shapes are also possible, and the devices should not be interpreted to be limited to rectangular or elliptical interior shapes.

Figure 10:
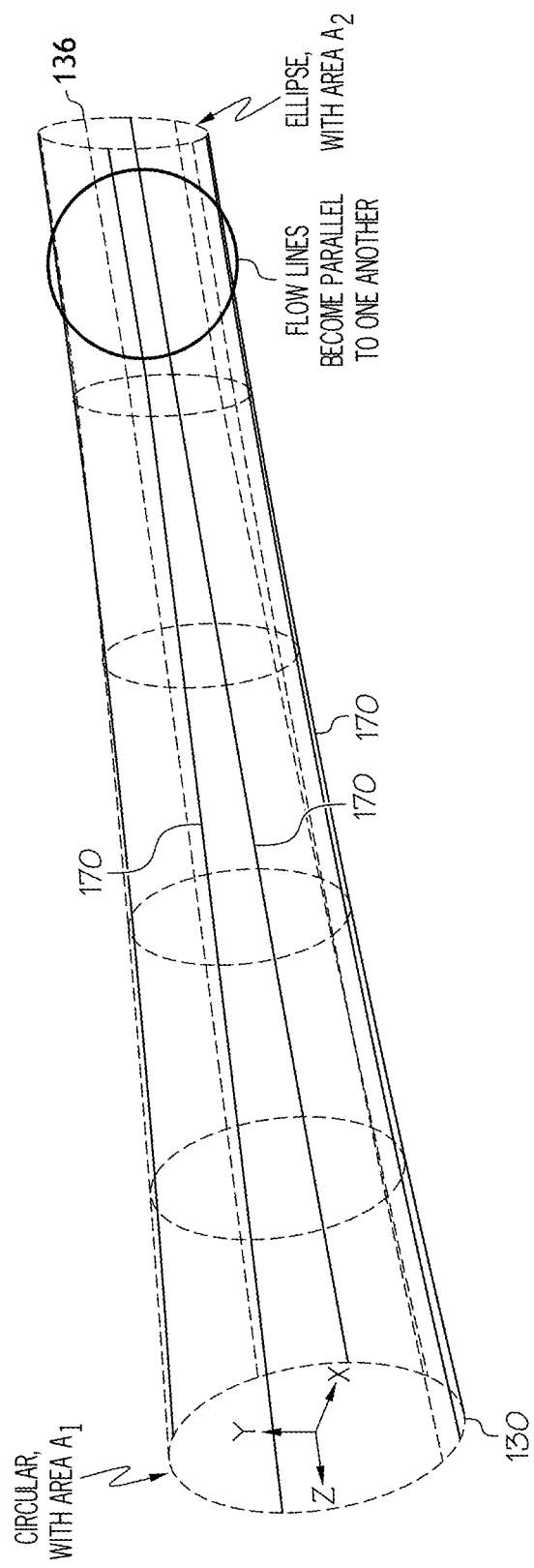
FIG. 10 is a model of the internal passageway within the motive section.

The interior of the motive passageway 109 and/or the discharge passageway may be constructed to have the same general shape. For example, the shape illustrated in FIG. 10 taken from co-pending application No. 14/294,727, begins at the motive inlet end 130 as a circular opening having an area $A_1$ and gradually, continuously transitions, as a hyperbolic function, to an ellipse opening at the motive exit 136 that has an area $A_2$, which is smaller than $A_1$. The circular opening at the motive inlet end 130 is connected to the ellipse-shaped motive exit 136 by hyperbola lines that provide the advantage of flow lines at the motive exit 136 being parallel to one another.

The suction passageway 111 defined by the suction port 110 is a generally cylindrical passageway of constant dimension(s) as shown in FIG. 1.

Figure 5:
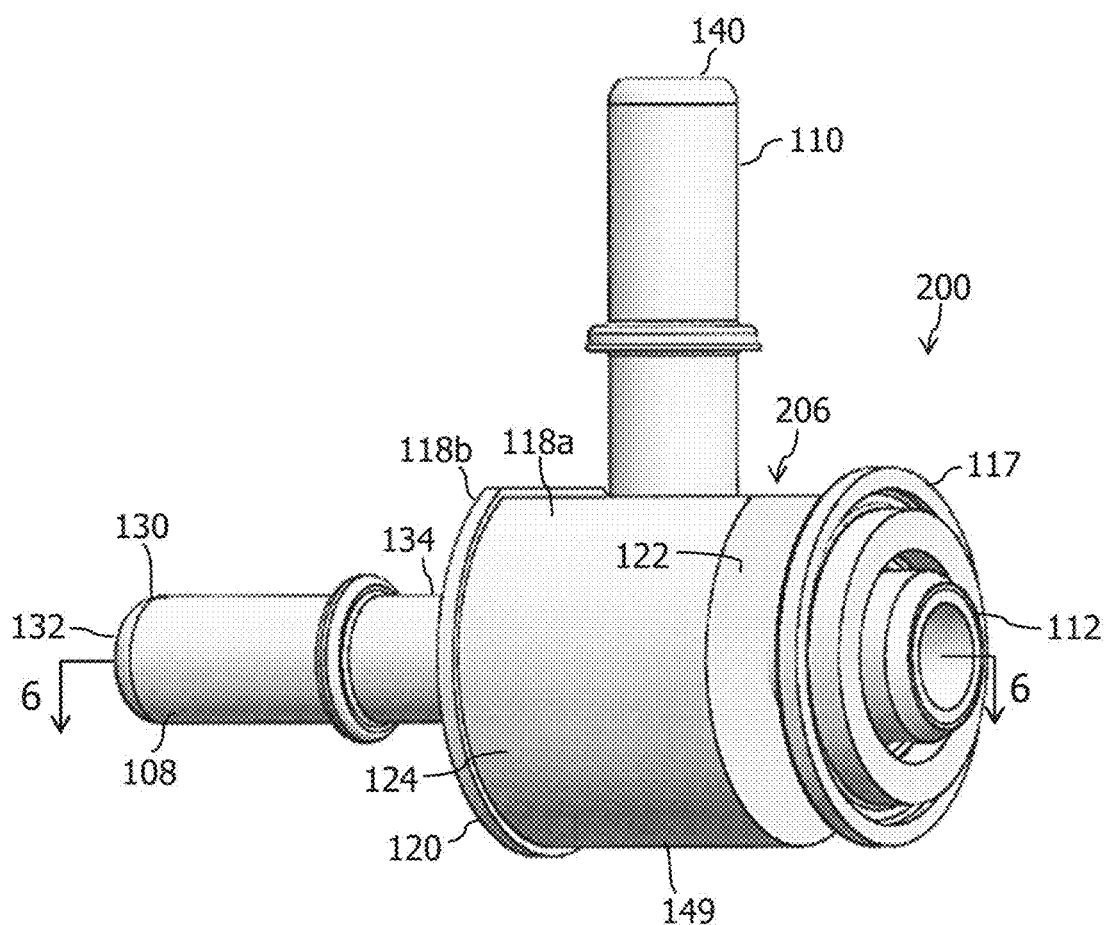
FIG. 5 is a side, perspective view of a second embodiment of a device that generates vacuum using the Venturi effect.
Figure 6:
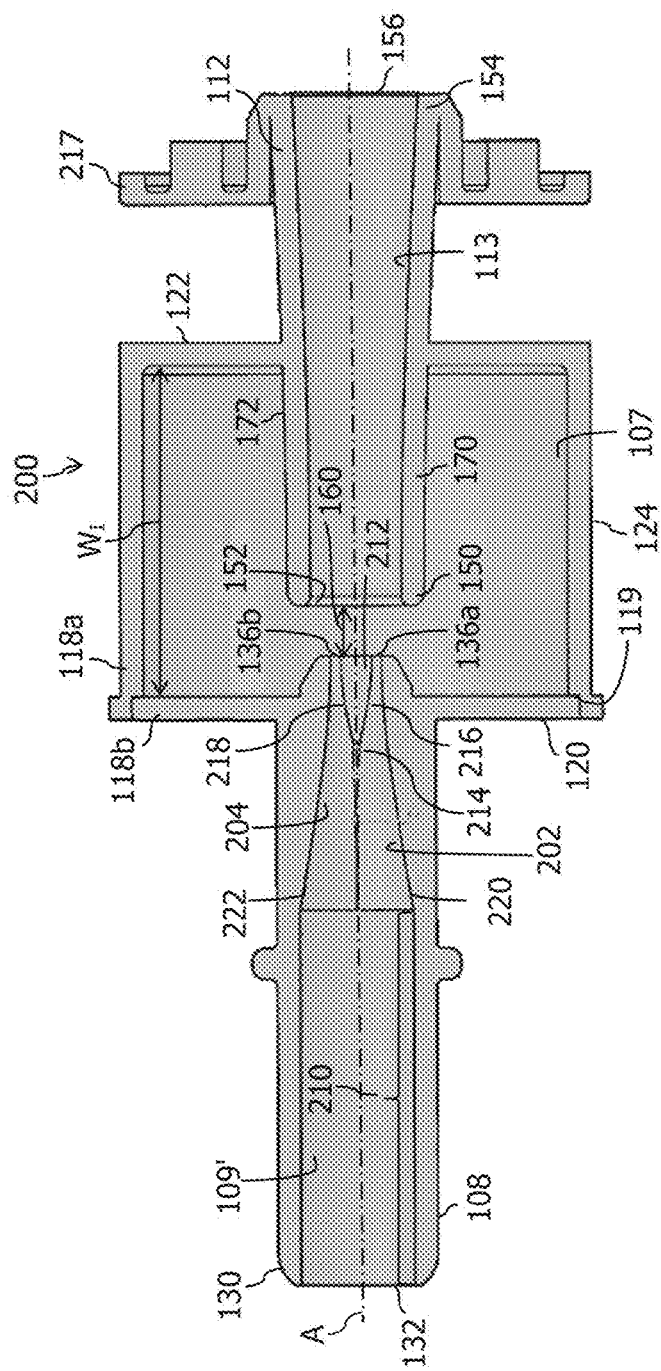
FIG. 6 is a top, longitudinal cross-sectional view of the device according to FIG. 5.
Figure 7:
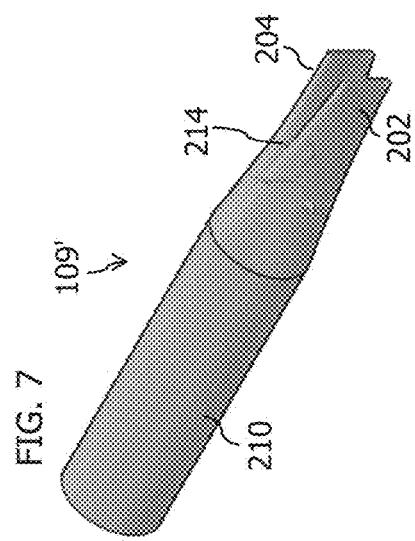
FIG. 7 is a model of the interior shape of the motive passageway of the device of FIGS. 5-6 showing a single entrance and two distinct exits.

Referring now to FIGS. 5-7, another embodiment of a device for producing vacuum using a Venturi effect, generally referred to by reference 200, is shown. The device 200, like device 100, may be used in an engine, for example, in a vehicle's engine to provide vacuum to a device such as a vehicle brake boost device, positive crankcase ventilation system, a fuel vapor canister purge device, a hydraulic and/or pneumatic valve, etc. Device 200 includes a housing 206 defining a suction chamber 107 in fluid communication with passageway 204 (FIG. 6) and having at least three ports that are connectable to an engine or components connected thereto. The ports include: (1) a motive port 108; (2) a suction port 110, which can connect via an optional check valve (not shown) to a device requiring vacuum (not shown); and (3) a discharge port 112. Each of these ports 108, 110, and 112 may include a connector feature 117 on an outer surface thereof for connecting the respective port to a hose or other component in the engine, as shown in FIG. 1B for the motive port 108 or a connector feature 217 as shown in FIG. 6 for the discharge port 112.

The housing 206 defining the suction chamber 107 includes a first end wall 120 proximate the motive port 108, a second end wall 122 proximate the discharge port 112 and at least one side wall 124 extending between the first and second end walls 120, 122. The suction chamber 107, when viewed in a transverse cross-section, may have a generally rounded bottom 149 below the entrance 152 to the discharge port 112. As shown in FIG. 6, the suction chamber 107 may be a two-part construction having a container 118a and a lid 118b, where the lid 118b seats within or against a rim 119 of the container 118a with a fluid-tight seal. Here, the container 118a includes the suction port 110 and the discharge port 112 and the lid 118b includes the motive port 108, but is not limited thereto. In another embodiment, the container could include the motive port and the lid could include the suction port and the discharge port.

The motive port 108 defines a motive passageway 109' for the flow of fluid toward the suction chamber 107 and in fluid communication therewith. The motive passageway 109' begins as a generally cylindrically-shaped main passageway 210 and subdivides downstream of the motive entrance 132 into two subpassageways 202, 204 each leading to its own discrete motive exit 136a, 136b, respectively. The motive exits 136a, 136b are generally aligned with and spaced apart from the discharge entrance 152 of the discharge passageway 113 to define the Venturi gap 160. FIG. 7 is a perspective view of a model of the void that defines the motive passageway 109', including the two subpassageways 202, 204. To define this shape for the motive passageway 109', the motive port 108 portion defines a void that is generally cylindrically-shaped extending in the upstream direction from the motive entrance 132, i.e., the main passageway 210 and defines the two subpassageways 202, 204 by having an interior shaped void that converges from the main passageway 210 toward the motive exits 136a, 136b and a partition body 212 proximate the motive exits 136a, 136b that defines a fork 214 in the motive passageway 109 for subdividing the two subpassageways 202, 204. The motive exits 136a, 136b may be generally rectangular in cross-section (the internal cross-section of the void defined by the housing to be the motive exits), as shown in FIG. 7, elliptical in cross-section, or other polygonally-shaped cross-section.

Figure 8A:
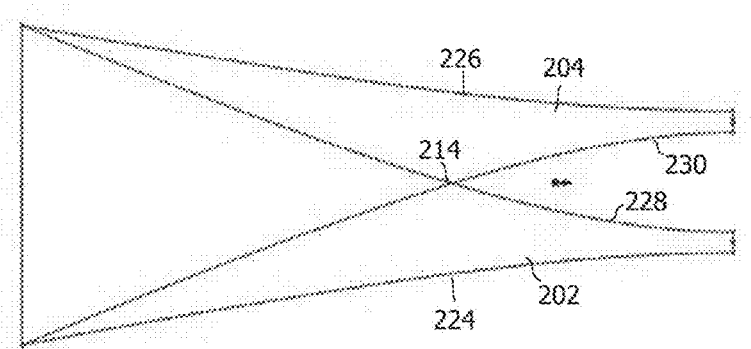
FIG. 8A is an illustration of one configuration for a first embodiment of the dual motive exit construction of the device according to FIG. 6.
Figure 9A:
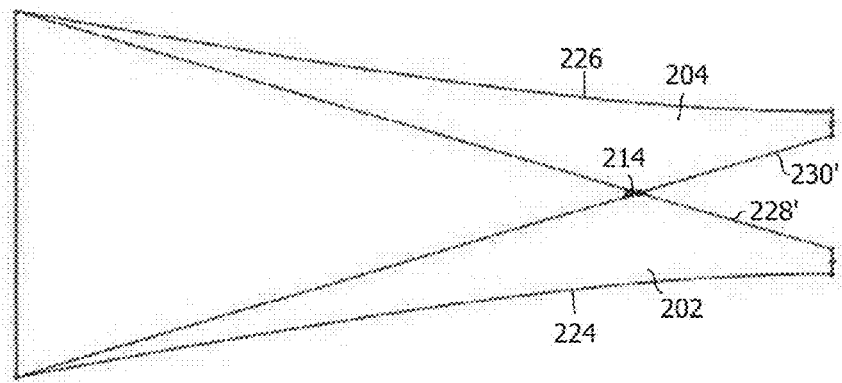
FIG. 9A is an illustration of one configuration for a second embodiment of a dual motive exit construction of the device according to FIG. 6.

The outer walls 216, 218 of the partition body 212 (FIG. 6) correspond to the inner lines 228, 230 in the illustrations of the profiles shown in FIGS. 8A and 9A. The profile for the inner lines 228, 230 in FIG. 8A are each generally curved according to the same function, such as the hyperbolic function shown, but may instead be a parabolic function or a polynomial function. The profile for the inner lines 228', 230' in FIG. 9A are each generally straight lines. The outer walls 220, 222 of the two subpassageways 202, 204 (FIG. 6, outer being relative from moving from the central longitudinal axis A radially outward) correspond to the outer lines 224, 226 in the illustrations of the profiles in FIGS. 8A and 9A. The profile of each of the outer lines 224, 226 in both illustrations is generally curved according to the same function, such as the hyperbolic function shown, but may instead be a parabolic function or a polynomial function.

Figure 8B:
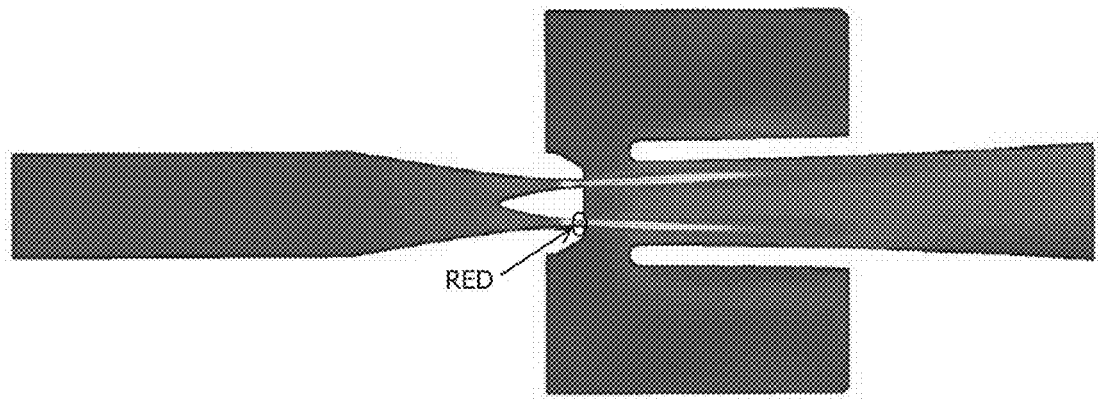
FIG. 8B represents CFD modeling top view of the fluid fields in the motive exits, suction passageway, and discharge section for the construction of FIG. 8A.
Figure 9B:
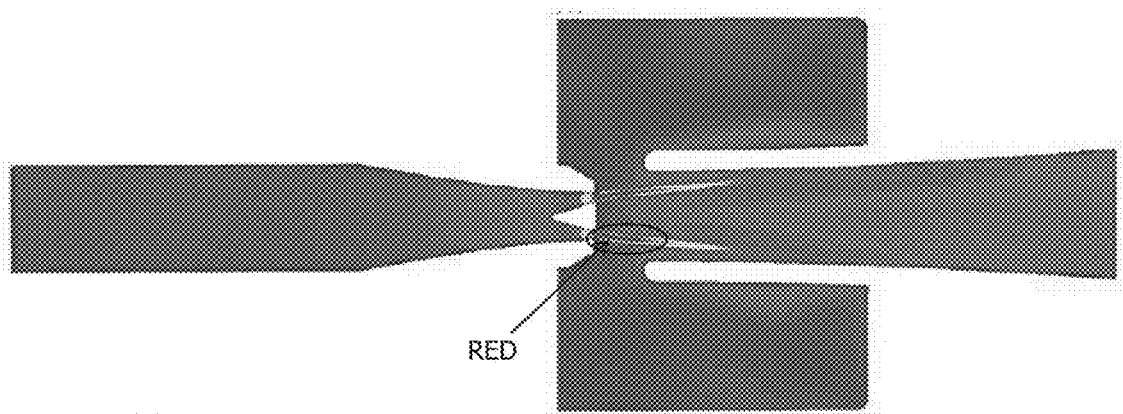
FIG. 9B represents CFD modeling of the fluid fields in the motive exits, suction passageway, and discharge section for the construction of FIG. 9A

As seen in a comparison of FIGS. 8A and 8B with FIGS. 9A and 9B, the profiles of the inner lines 228, 230 changes the position of the fork 214, and as seen in the color computational fluid dynamics models of FIGS. 8B and 9B, the position of the fork 214 affects not only the angle of the flow from the motive exits 136a, 136b, but the amount of the suction flow. The increased amount of red in FIG. 9B demonstrates that the suction flow with a partition body 212 having straight profiled outer walls 216, 218 is greater than in FIG. 8B with hyperbolic profiled outer walls.

Still referring to FIG. 5, the suction port 110 defines a suction passageway in fluid communication with the suction chamber 107. The suction port 110 includes an inlet end 140 having a suction entrance 142 and an outlet end having a suction exit, wherein both the motive exit 136 and the suction exit exit into the suction chamber 107 as illustrated generally in FIG. 2. In the device 200, however, the suction port 110, enter the suction chamber 107 at a position that generates about a ninety degree change in the direction of the suction flow from the suction passageway to the discharge passageway 113 as can be appreciated from FIG. 5. Accordingly, the suction port 110 is generally oriented perpendicular to the discharge port 112, and may be a generally cylindrical passage of constant dimension(s) as shown in FIG. 2, or it may gradually, continuously taper as a cone or according to a hyperbolic or parabolic function along its length converging toward the suction chamber 107. In other embodiments, the suction port 110 could enter the suction chamber 107 at a position that generates about a 180 degree change in the direction of the suction flow from the suction passageway 111 to the discharge passageway 113 (generally parallel to the discharge port 112) as illustrated for device 100.

Referring to FIGS. 5 and 6, the discharge port 112 defines a discharge passageway 113, which diverges away from the suction chamber 107, that is in fluid communication with the suction chamber 107. The discharge port 112 includes an inlet end 150 within the suction chamber 107, having a discharge entrance 152, and an outlet end 154, distal from the suction chamber 107, having a discharge exit 156. The discharge passageway 113 terminates in a spout 170 protruding into the suction chamber 107, which has an internal width $W_I$ of about a 10 mm to about a 25 mm, or more preferably about 15 mm to about 20 mm. The spout 170 is disposed spaced apart from all one or more sidewalls 124 of the suction chamber 107 thereby providing suction flow around the entirety of an exterior surface 172 of the spout 170. The exterior surface 172 is generally frustoconical and converges toward the inlet end 150 of the discharge passageway 113. The exterior surface 172 may transition into a chamfer (not shown) more proximate the inlet end 150 than the second first end wall 122. The shape of the exterior surface 172, and/or the chamfer, and the generally rounded interior bottom of the suction chamber 107 are advantageous to direct suction flow toward the discharge entrance 152 and do so with minimal disturbance/interference in the flow. The spout 170 has a wall thickness that may be about 0.5 mm to about 5 mm, or about 0.5 to about 3 mm, or about 1.0 mm to about 2.0 mm depending upon the material selected for the construction of the device 100.

Also, as best seen in FIG. 6, the cross-sectional area of the motive exits 136 (collectively) is smaller than the cross-sectional area of the discharge entrance 152, this difference is referred to as the offset. The offset of the cross-sectional areas may vary depending upon the parameters of the system into which the device 100 is to be incorporated. In one embodiment, the offset may be in the range of about 0.1 mm to about 2.0 mm, or more preferably in a range of about 0.3 mm to about 1.5 mm. In another embodiment, the offset may be in the range of about 0.5 m to about 1.2 mm, or more preferably in a range of about 0.7 to about 1.0 mm.

The devices disclosed herein may be made of a plastic material or other suitable material(s) for use in a vehicle engine, one that can withstand engine and road conditions, including temperature, moisture, pressures, vibration, and dirt and debris, and may be made by injection molding or other casting or molding processes.

Although the invention is shown and described with respect to certain embodiments, it is obvious that modifications will occur to those skilled in the art upon reading and understanding the specification, and the present invention includes all such modifications.

What is claimed is:

1. A device for producing vacuum using the Venturi effect comprising:
    a housing defining a suction chamber, a motive passageway having a main passageway and a continuously tapering section converging toward the suction chamber along a length from the main passageway to a motive exit and in fluid communication with the suction chamber, a discharge passageway diverging away from the suction chamber and in fluid communication with the suction chamber, and a suction passageway in fluid communication with the suction chamber;
    wherein, within the suction chamber, the motive exit of the motive passageway is aligned with and spaced apart from a discharge entrance of the discharge passageway to define a Venturi gap;
    wherein the discharge entrance is in a first wall of the suction chamber and a suction entrance of the suction passageway is in the first wall of suction chamber at a position that generates a 180 degree change in the direction of suction flow from the suction passageway to the discharge passageway.

2. The device of claim 1, wherein the continuously tapering section and the discharge passageway both diverge in cross-sectional area as a hyperbolic or parabolic function, wherein the hyperbola or parabola function provide flow lines at the motive exit that are parallel to one another.

3. The device of claim 1, wherein the discharge entrance is flush with the first wall of the suction chamber and transitions thereto with a first corner radius around the entire opening inside the discharge passageway.

4. The device of claim 1, wherein the cross-sectional area of the motive exit is smaller than the cross-sectional area of the discharge entrance.

5. The device of claim 1, wherein the motive passageway terminates in a spout protruding into the suction chamber and disposed spaced apart from all one or more walls of the suction chamber thereby providing suction flow around the entirety of an exterior surface of the spout.

6. The device of claim 5, wherein the exterior surface of the spout converges toward an outlet end of the motive passageway with a first converging angle when viewed in a longitudinal cross-section and transitions into a chamfer more proximate the motive exit, the chamfer has a second converging angle that is greater than the first converging angle.

7. The device of claim 5, wherein, when viewed in a cross-section taken transverse to a lineal distance ($V_D$) of the Venturi gap, the suction chamber has a rounded interior bottom below the spout.

8. The device of claim 1, wherein the motive passageway has a single entrance and two or more motive exits, and subdivides downstream of the single entrance into two or more subpassageways each leading to one of the two or more motive exits.

9. The device of claim 8, wherein each subpassageway is rectangular in cross-section proximate one of the two or more motive exits.

10. The device of claim 8, wherein each subpassageway converges toward one of the two or more motive exits from a main passageway with an outer interior wall, when viewed from a top, longitudinal cross-section, as a hyperbolic function.

11. The device of claim 10, wherein each subpassageway converges toward one of the two or more motive exits from the main passageway with an inner interior wall, when viewed from a top, longitudinal cross-section, as a hyperbolic function.

12. A system comprising:
    the Venturi device of claim 1;
    a source of pressure fluidly connected to the motive passageway;
    a device requiring vacuum fluidly connected to the suction passageway; and
    a pressure, lower than the source of pressure, fluidly connected to the discharge passageway;
    wherein the source of pressure is atmospheric pressure or is boost pressure from a compressor of a turbocharger or supercharger.

* * * * *